US006042545A

United States Patent [19]

Hossack et al.

[11] Patent Number: 6,042,545

[45] Date of Patent: Mar. 28, 2000

[54] MEDICAL DIAGNOSTIC ULTRASOUND SYSTEM AND METHOD FOR TRANSFORM ULTRASOUND PROCESSING

[75] Inventors: John A. Hossack, Palo Alto; Samuel H. Maslak, Woodside, both of Calif.

[73] Assignee: Acuson Corporation, Mountain View, Calif.

[21] Appl. No.: 09/200,021

[22] Filed: Nov. 25, 1998

[51] Int. Cl.[7] .......... A61B 8/00

[52] U.S. Cl. .......... 600/443; 600/447

[58] Field of Search .......... 600/437, 441, 600/443, 444, 447, 458; 364/725, 726; 382/6, 22, 54

[56] References Cited

U.S. PATENT DOCUMENTS

| | | | |
|---|---|---|---|
| 5,224,062 | 6/1993 | McMillan, Jr. et al. | 364/725 |
| 5,253,192 | 10/1993 | Tufts | 364/726 |
| 5,351,305 | 9/1994 | Wood et al. | 382/6 |
| 5,438,998 | 8/1995 | Hanafy . | |
| 5,479,926 | 1/1996 | Ustuner et al. . | |
| 5,497,777 | 3/1996 | Abdel-Malek et al. | 600/443 |
| 5,678,544 | 10/1997 | DeLonzor et al. . | |
| 5,740,128 | 4/1998 | Hossack et al. . | |
| 5,793,701 | 8/1998 | Wright et al. . | |
| 5,850,484 | 12/1998 | Beretta et al. . | |

OTHER PUBLICATIONS

Gregory K. Wallace, *The JPEG Still Picture Compression Standard,* Dec., 1991, pp. 1–17.

Tim Edwards, *Discrete Wavelet Transforms: Theory and Implementation,* Sep., 1991, pp. 1–27.

Ronald A. DeVore and Bradley J. Lucier, *Wavelets,* 1992, pp. 1–50.

Ronald A. DeVore and Bradley J. Lucier, *Fast Wavelet Techniques for Near–Optimal Image Processing,* Oct., 1992, pp. 1–7.

S. A. Krüger and A. D. Calway, *A Multiresolution Frequency Domain Method for Estimating Affine Motion Parameters,* pp. 113–116.

Hugh A. McCann et al, *Multidimensional Ultrasonic Imaging for Cardiology;* Sep., 1988, pp. 1063–1073.

Analog Devices Inc., *Analog Devices; Low Cost Multiformat Video Codec,* 1997, pp. 28–35.

*Primary Examiner*—Marvin M. Lateef
*Assistant Examiner*—Ali M. Imam
*Attorney, Agent, or Firm*—Craig A. Summerfield, Esq.; Brinks Hofer Gilson & Lione

[57] ABSTRACT

The preferred embodiment includes a method and system for processing ultrasound data during or after compression. Various compression algorithms, such as JPEG compression, are used to transfer ultrasound data. The ultrasound data may include image (i.e. video data) or data obtained prior to scan conversion, such as detected acoustic line data or data complex in form. Compression algorithms typically include a plurality of steps to transform and quantize the ultrasound data. Various processes in addition to compression may be performed as part of one or more of the compression steps. Furthermore, various ultrasound system processes typically performed on uncompressed ultrasound data may be performed using compressed or partially compressed ultrasound data. Operation on compressed or partially compressed data may more efficiently provide processed data for generation of an image. Fewer operations are required by one or more processors when operating on compressed or partially compressed data than for uncompressed or non-compressed data. In one embodiment, partially compressed data may be input into a look-up table for contrast enhancement. In another embodiment, partially compressed data is high passed filtered.

41 Claims, 2 Drawing Sheets

MEDICAL DIAGNOSTIC ULTRASOUND SYSTEM AND METHOD FOR TRANSFORM ULTRASOUND PROCESSING

BACKGROUND

This invention relates to techniques for processing ultrasound data. In particular, a method and system are provided for compressing data, in part, and performing various ultrasound processes on the partially compressed data.

Conventional ultrasound systems send and receive acoustic line data. The receive data is beamformed, detected and then scan converted to produce a raster format display for presentation on a video monitor. Typically, there is some basic image processing performed prior to the display step. Additionally, ultrasound machines typically incorporate a means for saving digital image data off-line for later review. Due to the high speeds required (real time operation =approx. 30 frames per second) the processing and saving processes tend to be simple.

One example of image processing includes using a look-up table to provide contrast enhanced images. U.S. Pat. No. 5,479,926 discloses inputting two sources of detected ultrasound data into a look-up table to provide contrast enhanced images. The two sources include an original frame of ultrasound data and a low pass filtered frame of ultrasound data. The look-up table outputs a frame of data representing a combination of the two sources of data.

Another example of image procession is filtering. Typically filtering operations on the image data are performed using expensive convolution based digital filters. Furthermore, the saving operation frequently involves using a transform (such as the Discrete Cosine Transform—a component in JPEG) prior to saving in order to compress the volume of data—to save storage device capacity and to speed up data transfer over limited capacity data links.

SUMMARY

The present invention is defined by the following claims, and nothing in this section should be taken as a limitation on those claims. By way of introduction, the preferred embodiment described below includes a method and system for processing ultrasound data during or after compression. Various compression algorithms, such as JPEG compression, are used to transfer ultrasound data. The ultrasound data my include image (i.e. video data) or data obtained prior to scan conversion, such as detected acoustic line data or data complex in form. Compression algorithms typically include a plurality of steps to transform and quantize the ultrasound data. Various processes in addition to compression may be performed as part of one or more of the compression steps. Furthermore, various ultrasound system processes typically performed on uncompressed ultrasound data may be performed using compressed or partially compressed ultrasound data. Operation on compressed or partially compressed data may more efficiently provide processed data for generation of an image. Fewer operations are required by one or more processors when operating on compressed or partially compressed data than for uncompressed or non-compressed data.

In one embodiment, partially compressed data may be input into a look-up table for contrast enhancement.

In another embodiment, partially compressed data is high passed filtered.

DETAILED DESCRIPTION OF PREFERRED EMBODIMENTS

Figure 1:
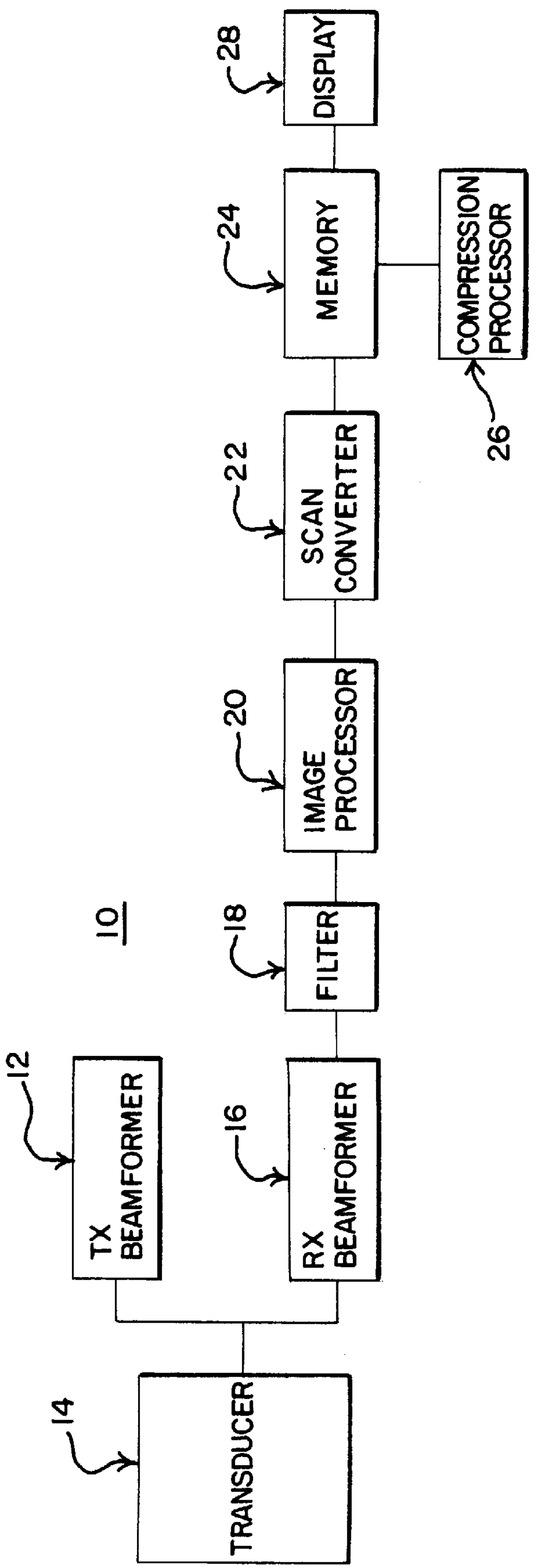
FIG. 1 is a block diagram of one embodiment of an ultrasound system for providing ultrasound data processing of compressed or partially compressed ultrasound data.

Referring now to FIG. 1, an ultrasound system for two and three-dimensional imaging is generally shown at 10. The ultrasound system 10 includes a transmit beamformer 12, a transducer 14, a receive beamformer 16, a filter block 18, an image processor 20, and a scan converter 22. The ultrasound system 10 is configurable to acquire information corresponding to a plurality of two-dimensional representations or image planes of a subject for three-dimensional reconstruction or two-dimensional imaging. Other methods, such as those associated with a two dimensional or single element transducer array, may be used. To generate a plurality of two-dimensional representations of the subject during an imaging session, the ultrasound system 10 is configured to transmit, receive and process during a plurality of transmit events. Each transmit event corresponds to firing along an ultrasound scan line in the subject.

The transmit beamformer 12 is of a construction known in the art, such as a digital or analog based beamformer capable of generating signals at different frequencies. The transmit beamformer 12 generates one or more excitation signals. Each excitation signal has an associated center frequency. Preferably, the center frequency of the excitation signals is within the 1 to 15 MHz range, such as 2 MHz, and is selected to be suitable for the frequency response of the transducer 14. The excitation signals preferably have non-zero bandwidth and are shaped to reduce energy in harmonic frequency bands as disclosed in U.S. Pat. No. 5,740,128.

For each or a plurality of transmit events, control signals are provided to the transmit beamformer 12 and the receive beamformer 16. The transmit beamformer 12 is caused to fire one or more acoustic lines for each transmit event. As known in the art, the ultrasonic beams or scan lines are focused in one of various formats, such as linear, steered linear, sector, or Vector®.

Each beam may be transmitted with a point or a line focus. The line focus, such as associated with an Axicon lens, distributes the peak energy along the beam and is disclosed in U.S. Pat. No. 5,740,128. Other focal arrangements may be used, such as a multi-point focus.

The excitation signals from the transmit beamformer 12 are provided to the transducer 14. For imaging pulsatile targets within the subject (e.g. heart or carotid), gating is preferably used to trigger application of the excitation signals to the transducer 14. In order to further improve three-dimensional imaging, only images corresponding to selected portions of the ECG cycle, the respiratory cycle or both are utilized. Both ECG gating and respiratory gating and triggering are well known in three-dimensional reconstruction of images. See, for example, McCann et al. "Multidimensional Ultrasonic Imaging for Cardiology" at p. 1065. With ECG gating or triggering, a window is selected a fixed time duration after the ECG pulse maximum. With respiratory gating, it is often simplest to ask the patient to hold his or her breath for the short duration of the ultrasonic scan. Alternatively, chest motion can be recorded using a displacement sensor, and data can be selected for a portion of the respiratory cycle. As yet another alternative, the temperature of air in the patient's nostrils is detected and used as an indication of phase of the respiratory cycle.

Based on the gating or other inputs, the excitation signals are provided to the transducer 14. The transducer 14 is of any construction known in the art, such as the one-dimensional, multiple element Acuson 8L5 transducer array discussed above. The elevation aperture of the Acuson 8L5 transducer is fixed and typically not apodized. For imaging associated with 8 MHz, the elevation aperture may vary from 4 mm in the near field to about 1 mm at the geometric focus (e.g. 18 mm) and then extend to 4 mm or more in the deeper or far field. Alternatively, A plano-concave transducer may be used, such as disclosed in U.S. Pat. Nos. 5,678,544 and 5,438,998. Plano-concave transducers may provide improved elevation beam profiles, resulting in reduced artifacts in the 3D image.

One or more of the elements in the transducer 14 are excited by an excitation signal to produce ultrasonic acoustic waveforms. In particular, the transducer 14 converts these excitation signals into ultrasonic energy that is directed along transmit beams into the subject, such as the body of a medical patient. Scattering sites within the subject, such as contrast agents or tissue in the subject, cause echo information to be returned to the transducer 14. This echo information is converted by the transducer 14 into electrical signals that are applied to the receive beamformer 16.

The receive beamformer 16 is of a construction known in the art, such as an analog or digital receive beamformer capable of processing signals associated with different frequencies. The receive beamformer 16 and the transmit beamformer 12 may comprise a single device. The receive beamformer 16 is caused to generate in phase and quadrature (I and Q) information along one or more scan lines. Alternatively, RF signals may be generated. A complete frame of I and Q information corresponding to a two-dimensional representation (a plurality of scan lines) is preferably acquired before I and Q information for the next frame is acquired (the frames are sequentially acquired).

As known in the art, the electrical signals from the transducer 14 are delayed, apodized, and summed with other electrical signals to generate the I and Q information. An ongoing stream of summed signals represents the ultrasound beam or line, or portions of the lines when multiple transmit focus depths per line are used, received from the body. The receive beamformer 16 passes the signals to the filter block 18.

The filter block 18 passes information associated with a desired frequency band, such as the fundamental band, a harmonic frequency band of the fundamental frequency, or an intermediate frequency band. The filter block 18 may be included as part of the receive beamformer 16. Furthermore, the block 18 preferably comprises one filter that is programmable to pass different frequency bands, such as fundamental, second or third harmonic bands. For example, the filter block 18 demodulates the summed signals to baseband. The demodulation frequency is selected in response to the fundamental center frequency or another frequency, such as a second harmonic center frequency. For example, the transmitted ultrasonic waveforms are transmitted at a 2 MHz center frequency. The summed signals are then demodulated to baseband by shifting by either the fundamental 2 MHz or the second harmonic 4 MHz center frequencies (the demodulation frequency). Other center frequencies may be used. Signals associated with frequencies other than near baseband are removed by low pass filtering.

As an alternative or in addition to demodulation, the filter block 18 provides band pass filtering. The signals are demodulated to an intermediate frequency (IF)( e.g. 2 MHz) or not demodulated and a band pass filter is applied. Thus, signals associated with frequencies other than a range of frequencies centered around the desired frequency or an intermediate frequency (IF) are filtered from the summed signals. The demodulated or filtered signal is passed to the image processor 20 as the complex I and Q signal, but other types of signals, such as RF signals, may be passed.

The image processor 20 comprises one or more processors for generating two-dimensional Doppler or B-mode information. For example, a B-mode image, a color Doppler velocity image (CDV), a color Doppler energy image (CDE), a Doppler Tissue image (DTI), a Color Doppler Variance image, or combinations thereof may be selected by a user. The image processor 20 detects the appropriate information for the selected image. Preferably, the image processor 20 comprises a Doppler processor 28 and a B-mode processor 30. Each of these processors is preferably a digital image processor and operates as known in the art to detect information. The Doppler processor 28 estimates velocity, variance of velocity and energy (with or without clutter filtering) from the I and Q signals. The B-mode processor 30 generates information representing the intensity of the echo signal associated with the I and Q signals.

In one embodiment, the image processor 20 preferably comprises a Doppler flow processor, a Doppler Tissue processor and a B-mode processor. The Doppler Tissue and flow processors may comprise one Doppler processor and a wall filter that outputs interleaved types or a selected type of data. The wall filter filters out low frequency (tissue) signals for Doppler flow processing and performs less filtering to include low frequency tissue signals for Doppler Tissue processing.

The Doppler flow processor estimates one or more types of data, such as Doppler flow velocity, flow variance of velocity and flow energy from the I and Q signals. The Doppler Tissue processor also estimates one or more types of data, such as Doppler tissue velocity, tissue variance of velocity and tissue energy from the I and Q signals. Preferably, each of these types of Doppler data is independent of the other types. For example, the Doppler velocity data is not adjusted as a function of a Doppler energy threshold. Alternatively, only limited processing, such as default low energy threshold levels, are applied to other data. User input is used to select application of any further or higher threshold or other combination levels.

The B-mode processor generates information representing the intensity of the echo signal associated with the I and Q signals. In this embodiment, the intensity information may include one or more types of B-mode information, such as fundamental and harmonic frequency based information or low pass and all pass filtered information. Separate transmit firings may be used for each line of B-mode intensity harmonic and fundamental information. Alternatively, separate receive beamformers for each frequency band are used to obtain data from the same transmit firing. Preferably, the fundamental and harmonic lines are fired alternately. Alternatively, the firings are interleaved by frame.

In either case, substantially the same two or three-dimensional region of the patient is scanned. The term "substantially" is used to account for unintentional movement of the transducer relative to the patient. Alternatively, the selected types of data represent different regions, such as elevationally spaced regions.

The information generated by the image processor 20 is provided to the scan converter 22. Alternatively, the scan converter 22 includes detection steps as known in the art and described in U.S. application Ser. No. 08/806,922 (Atty. Ref. No. 5050/189). The scan converter 22 is of a construction known in the art for arranging the output of the image processor 20 into two-dimensional representations. Preferably, the scan converter 22 outputs video image data frames for display. The frames may be exported in a DICOM Medical industry image standard format or a TIFF format. The exported data may comprise compressed data as discussed below. Thus, the plurality of two-dimensional representations are generated. Each of the representations corresponds to a receive center frequency, such as a second harmonic center frequency, and a type of imaging, such as B-mode. For three-dimensional imaging, the representations may also correspond to elevation positional information.

The scan converted ultrasound data are stored in a memory 24. The memory 24 comprises any one of various memories, such as a RAM memory, a disk memory, or a tape memory. In one embodiment, the memory 24 is internal to the ultrasound system 10, such as a memory for CINE playback. In alternative embodiments, the memory 24 is provided between the image processor 20 and the scan converter 22 or at another location in the system 10. In other embodiments, the memory 24 is remote from the ultrasound system 10, such as a memory associated with the Aegis® workstation manufactured by Acuson Corporation or another workstation.

One or more frames of ultrasound data are stored separately in the memory 24. The separate frames of data may be associated with different amounts of processing, such as no spatial or temporal compounding, some spatial and/or temporal compounding and other levels of other processes.

Typically, data for CINE playback is associated with uncompressed ultrasound data formatted along acoustic lines, so frames of data for a few seconds worth of imaging are provided. Remote memories, such as associated with remote workstations, typically store compressed ultrasound data, such as associated with JPEG compression. Frames of data for one minute or more of imaging may be separately stored. Preferably, three or more frames of ultrasound data are separately stored.

A compression processor 26 is operable to access the memory 24. The compression processor 26 comprises a digital image processor or a general processor with software for processing compressed or partially compressed ultrasound data as discussed below. The compression processor 26 may be internal to the ultrasound system 10, such as a dedicated processor or a general purpose control processor. Alternatively, the compression processor 26 is remote from the ultrasound system 10, such as an Aegis® workstation or other remote workstation processor. The compression processor 26 may be in series with the rest of the ultrasound system 10.

In order to save memory space as well as processing time, one or more frames of ultrasound data may be transformed into compressed frames of ultrasound data and stored in a memory. The compression processor 26, the scan converter 26 , the image processor 20 or another processor compresses the ultrasound data. For example, the ultrasound system 10 transforms, quantizes, and encodes the frames of ultrasound data prior to transfer to a remote memory, such as the memory 24. Data associated with the transform step, whether only transformed, transformed and quantized or compressed is referred to herein as being in the transform domain.

Any of various transforms, quantization functions and encoding functions may be used for compression. For example, JPEG compression divides the frames of data into 8×8 blocks of data, performs a two-dimensional Discrete Cosine Transform (DCT) on each of the blocks, quantizes the result, changes a DC value to a DC difference from previous blocks, and performs entropy encoding (e.g. Huffman encoding). Other algorithms may be used, such as algorithms including Run Length Encoding to remove sequences of zeros before performing entropy encoding. Generally, these algorithms are essentially linear but may include functions which are non-linear. Furthermore, variable code lengths may be produced due to entropy based encoding. Compression algorithms may be lossy or loss less. For example, JPEG algorithms may be either lossy or loss less.

While the transformation step is computationally intensive, there is a wide selection of low cost integrated circuits (ICs; e.g. Analog Device ADV601) available to transform and/or quantize at real time rates. These transforms include the Discrete Cosine Transform (DCT) and the Discrete Wavelet Transform(DWT). The transformation devices typically perform part or all of the compression steps discussed above.

During or after compression of the ultrasound data, the compression processor 26 performs ultrasound processing different than compression. Non-compression processes are performed in the transform domain. For example, ultrasound data processed for compression except for the entropy encoding is high pass filtered. As another example, compressed frames of data are compounded together for spatial or temporal persistence.

For processing partially compressed ultrasound data in the transform domain, compressed ultrasound data may be modified. Even if an IC performs all of the compression steps, the entropy encoding step or another step may be undone or reversed. For example, entropy encoding is undone so that the transformed and quantized data is provided. Since the transformation process is generally the most computationally intensive operation, this inverse entropy encoding step does not significantly reduce net efficiency.

Transformed and quantized ultrasound data may be useful for image processing since it is still in a 'pure' transform domain. As used herein, the pure transform domain includes data that may be inverse transformed directly without performing the entropy encoding or decoding step. Quantized data is preferred. A degree of quantization is tolerable which simultaneously satisfies the requirements for practically insignificant perceived image quality loss and high image data compression (data reduction).

Since the data is in the transformed domain, one or more ultrasound operations may be performed very efficiently. In particular, the DCT is very similar in form to the Fast Fourier Transform (FFT). Many useful properties relate to FFT data that provide for convenient processing in the transform domain. These properties include: linearity and the fact that convolution in the time domain is the same as performing multiplication in the frequency domain. Multiplications are computationally simpler (faster) than convolutions.

As an example of making maximum use of transform properties, a filter which involves convolution in temporal or spatial domains may be implemented using multiplies in the transform domain. The characteristics of the filter are defined in the frequency domain and then multiplied with the transformed image data. For example, a high pass filter will multiply low frequency and DC values by numbers less than 1.0, and high frequency components are multiplied by 1.0. The numbers used are determined as a function of the desired filtering. Thereafter the data can be inverse transformed to yield filtered image data. Alternatively, the compression process is completed, and the compressed data is subsequently uncompressed to generate a filtered image.

Similar low pass and band pass flitters may be implemented by selecting the appropriate weightings in the transform domain. As an example, these weightings may describe a Gaussian function with a defined cutoff frequency (i.e. width).

In one embodiment, the low pass filtered data in the transformed domain is used for further ultrasound image processing. As described in U.S. Pat. No. 5,479,926 (Ustuner), the disclosure of which is incorporated herein by reference, low pass filtered and all pass filtered data are used in a contrast enhancing operation. The two sources of data are input into a look-up table designed to output contrast enhanced data. The user or the ultrasound system 10 selects between emphasizing the low-pass data, emphasizing the original frame and emphasizing portions of both frames of data. This process requires first finding a low pass filtered form of the original image in the transform domain. This filtering operation may be performed efficiently in the transform domain. The low pass filtered image in the transform domain may be inverse transformed to create the low pass filtered image. Then, the original and the low pass filtered image are input into the look-up table.

Figure 2:
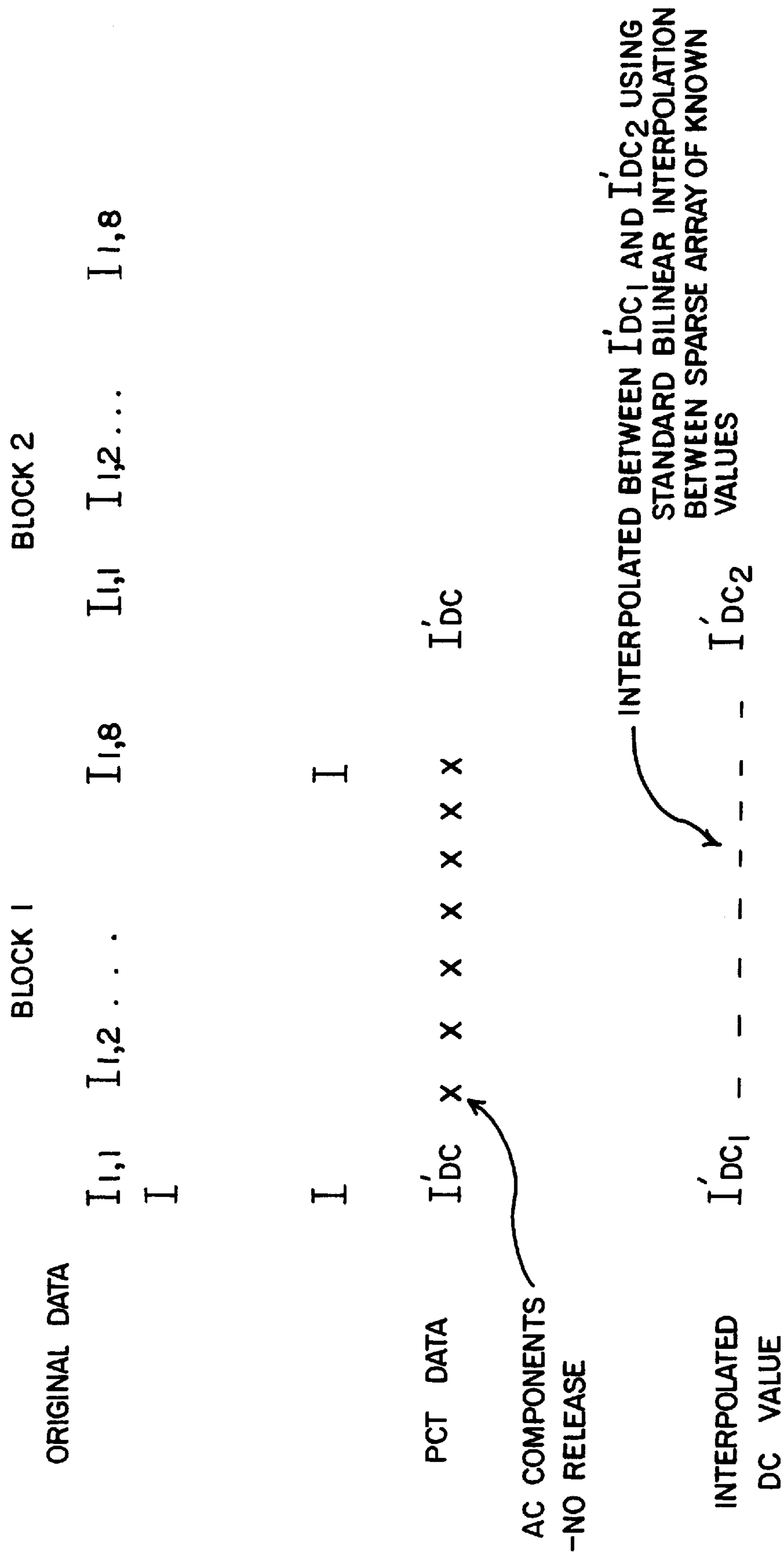
FIG. 2 is a graphical representation of an interpolation scheme.

Since the exact form of the low pass filtered image is not critical, approximations may be used. As an example in the JPEG operation, the image is divided into 8×8 image blocks. The DCT operation will find the DC value within each of these image blocks. This DC value is equivalent to the average of 64 image pixels within that block and hence these DC values described very approximately a low pass filtered version of the original image. There is only one DC value for every 64 input pixels, so data is interpolated between these sparse DC values to find corresponding data for the intermediate pixel locations. See FIG. 2 for an example. A bilinear or other interpolation may be used. This interpolation process is still much more efficient than a conventional low pass filtering operation.

Filtering operations may also be done using the wavelet transform domain. The wavelet transform is analogous to the Fourier Transform in that it produces as the transform a set of coefficients related to the frequency components of the original data set. Whereas the basis function used in the Fourier Transform is a simple sinusoid, the basis function used in the wavelet transform is defined by a recursive difference equation:

$$\phi(x) = \sum_{k-0}^{M=1} C_k \phi(2x-k)$$

such as disclosed in "Descrete Wavelet Transforms Theory And Application," by Tim Edwards, Stanford Univ. (Jun. 4, 1992) (www.mathsoft.com).

Using the ADV601 IC, a set of filters and decimators operating in the horizontal and vertical dimensions are provided. The processed data is available in the transformed domain. Since the various components correspond to different frequency domain components, a filter is implemented by modifying the components directly in this domain. These wavelet domain values are available for processing via manipulation of the quantizer coefficients. Amongst the operations which can be performed in this way are filtering (e.g. low pass filtering), color saturation control, contrast control, image gain and edge or motion detection. The wavelet domain also offers a convenient way to extract scaled down images (useful when showing optionally 1, 4, 9 or more images per image frame).

Other ultrasound processes that may be performed with ultrasound data in the transform domain include: contrast adjustment, gain adjustment and edge detection. All of these image processing operations have some value in ultrasound imaging and are more efficiently performed in the transform domain than in the original pixel data domain.

Other applications or image processing in the transform domain include image motion estimation and tissue characterization. Motion estimation may be performed by relating the phase differences of different transform (frequency domain quantities to their associated displacements in the spatial (pixel image) domain. See for example, A Multiresolution Frequency Domain Method For Estimating Affine Motion Parameters, S. A. Kruger et al., Proceedings of IEEE Int'l Conf. on Image Processing, pp. 113–116 (1996). Motion estimates may be used in connection with forming an extended field of view or in connection with any image motion estimation. See for example, U.S. application Ser. No. 08/916,585 filed Aug. 22, 1998 and Serial No. 09/196,986 Attorney Docket No. 5050/490, filed Nov. 20, 1998, the disclosures of which are incorporated herein by reference. Motion estimates may be applied to multiple regions of the image (e.g., 8×8 regions pursuant to JPEG compression) or to the entire image.

Tissue characterization is performed by comparing the spatial texture of various regions of the image. The ratio between different frequency components indicates tissue type. Further, the analysis may be performed for multiple regions in an image. In the transform (frequency) domain coefficients are available that represent relative amplitudes of different spatial frequency components. The frequency components are related to image texture In another embodiment, the ultrasound data in the transform domain is compounded. The compressed frames of ultrasound data are compounded as discussed in U.S. application Ser. No. 09/199,945 (Attorney Docket No. 5050/438), filed herewith, for ULTRASONIC SYSTEM AND METHOD FOR COMPOUNDING, the disclosure of which is herein incorporated by reference. The compounding is performed by the compression processor 26. For example, the user inputs an amount of compounding or temporal persistence for use with a finite impulse response compounding filter, or correlation analysis between compressed frames of ultrasound data is performed to determine a desired or optimal amount of compounding. The compounding is performed for non-real time analysis, such as providing for a 200 millisecond or more delay between storage and compounding of the compressed frames of ultrasound data.

In one preferred embodiment, the entropy coding process or another process of the compression algorithm is reversed by the compression processor 26 or another processor. Compression includes transform and quantization steps. Transforms include pure and modified transforms. A 'pure transform' is a transform which allows for near perfect inversion without additional processing. For example, Fast Fourier transforms and discrete cosine transforms may comprise pure transforms. Pure transforms are invertible. Data can be transformed back and forth. In JPEG, the DCT creates a 'pure transform' which is invertible back to original data. However, entropy encoding creates a 'modified transform'. Once the entropy encoding is performed, the inversion transform may not be performed without first undoing the 'modifying' step. The quantizing step of JPEG compression is a non-linear step and is non-invertible. However, it is designed to be approximately linear and hence invertible since the degree of non-linearity produced is small.

Color quantities in the image are preferably accounted for when combining JPEG data. JPEG separates the image into luminance (brightness) and chrominance (color density). Compounding the chrominance value may produce an undesirable result (e.g. red and blue Color Doppler signals may be averaged, producing an unrealistic color). Therefore, combination may be performed on the luminance quantatives but not necessantly on the chrominance values. In this case the chrominance value for the most recent frames are associated with the compounded luminance frame. After any alteration of the compressed frames of ultrasound data to account for nonlinear processes, the frames of ultrasound data are combined.

After combination or other processing in the transform domain, the compressed frames of ultrasound data are stored or decompressed, such as performing the compression algorithm in the reverse order. After decompressing the frames of ultrasound data, an image or images are generated as discussed above in real time or as part of a later review. For real time imaging, the acquisition, transform, image processing, inverse transform and image generation are performed during the same imaging session or within a fraction of a second. In one embodiment, the ultrasound data is stored in the transform domain for later decompression or inverse transform and generation of an image or images. The ultrasound data in the transform domain may be stored before or after image processing in the transform domain.

Although the above discussion relates to image processing in the transform domain, subsequent image processing once the image has been inverse-transformed back to the original format may also be provided.

Lastly, the following patent application, which is assigned to the assignee of the present patent application, is hereby incorporated by reference: "Method and System for Simultaneously Displaying Diagnostic Medical Ultrasound Image Clips," Ser. No. 09/200,170 (Attorney Docket No. 5050/492), filed Nov. 25, 1998.

It is intended that the foregoing detailed description be understood as an illustration of selected forms that the invention can take and not as a definition of the invention. It is only the following claims, including all equivalents, that are intended to define the scope of this invention.

What is claimed is:

1. A method for processing ultrasound data with a medical diagnostic ultrasound imaging system, the method comprising the acts of:

(a) transforming the ultrasound data into a transform domain;

(b) compressing the transformed ultrasound data;

(c) image processing the compressed, transformed ultrasound data in the transform domain; and (d) inverse transforming the image processed ultrasound data.

2. The method of claim 1 further comprising:

(e) displaying an image responsive to the inverse transformed ultrasound data.

3. The method of claim 2 wherein step (e) comprises displaying the image as a two-dimensional image in real time.

4. The method of claim 1 further comprising:

(e) storing the ultrasound data in the transform domain.

5. The method of claim 4 wherein (e) comprises storing the ultrasound data in the transform domain prior to (c).

6. The method of claim 4 wherein (e) comprises storing the ultrasound data in the transform domain after (c).

7. The method of claim 4 wherein (e) comprises storing the ultrasound data in the transform domain for later image generation;

further comprising (f) of generating an image responsive to the ultrasound data stored in the transform domain.

8. The method of claim 1 wherein (c) comprises filtering the ultrasound data in the transform domain.

9. The method of claim 8 wherein (c) comprises multiplying the transformed ultrasound data in the transform domain.

10. The method of claim 8 further comprising:

(e) applying the inverse transformed ultrasound data responsive to (c) and other ultrasound data to a look-up table.

11. The method of claim 1 wherein (b) comprises quantizing the transformed ultrasound data.

12. The method of claim 1 wherein (a) and (b) comprise JPEG compression.

13. A medical diagnostic ultrasound system for processing ultrasound data, the system comprising:

a processor for transforming the ultrasound data into a transform domain, compressing the transformed ultrasound data, image processing the compressed, transformed ultrasound data in the transform domain, and inverse transforming the image processed ultrasound data; and a display for generating an image responsive to the inverse transformed ultrasound data.

14. The system of claim 13 further comprising a memory for storing the ultrasound data in the transform domain.

15. The system of claim 14 wherein the ultrasound data in the transform domain is stored in the memory prior to image processing in the transform domain.

16. The system of claim 14 wherein the ultrasound data in the transform domain is stored in the memory after image processing in the transform domain.

17. The system of claim 14 wherein the ultrasound data in the transform domain is stored in the memory for later image generation.

18. The system of claim 13 wherein the processor for image processing is operable to filter the ultrasound data in the transform domain as the image processing.

19. The system of claim 18 further comprising a look-up table, wherein the inverse transformed ultrasound data responsive to the filtering in the transform domain and other ultrasound data is input into the look-up table.

20. The system of claim 13 wherein the processor is operable to compress the transformed ultrasound data by quantization.

21. The system of claim 13 wherein the processor is operable to perform JPEG compression for transforming and compressing.

22. A method for processing a complete frame of ultrasound data with a medical diagnostic ultrasound imaging system, the method comprising the acts of:

(a) transforming the complete frame of ultrasound data into a transform domain;

(b) image processing the complete frame of transformed ultrasound data in the transform domain;

(c) inverse transforming the complete frame of image processed ultrasound data; and (d) displaying an image responsive to the complete frame of inverse transformed ultrasound data.

23. The method of claim 22 further comprising:

(e) compressing the complete frame of transformed ultrasound data: wherein (b) comprises image processing the complete frame of compressed, transformed ultrasound data.

24. A method for processing ultrasound data with a medical diagnostic ultrasound imaging system, the method comprising the step:

(a) transforming the ultrasound data into a transform domain;

(b) image processing the transformed ultrasound data in the transform domain with a type of image processing selected from the group consisting of: temporal filtering, compounding between frames of data, color saturation control, contrast control, image gain, edge detection, motion detection, image scaling, tissue characterization and combinations thereof; and (c) inverse transforming the image processed ultrasound data.

25. The method of claim 24 further comprising (d) compressing the transformed ultrasound data; wherein (b) comprises image processing the compressed, transformed ultrasound data.

26. The method of claim 24 wherein (b) comprises tissue characterization.

27. The method of claim 24 wherein (b) comprises image scaling.

28. The method of claim 24 wherein (b) comprises motion detection.

29. The method of claim 24 wherein (b) comprises edge detection.

30. The method of claim 24 wherein (b) comprises image gain.

31. The method of claim 24 wherein (b) comprises contrast control.

32. The method of claim 24 wherein (b) comprises temporal filtering.

33. The method of claim 24 wherein (b) comprises color saturation control.

34. The method of claim 24 wherein (b) comprises compounding between frames of data.

35. The method of claim 34 wherein (b) comprises finite impulse response filtering.

36. A method for processing ultrasound data with a medical diagnostic ultrasound imaging system, the method comprising the acts of:

(a) transforming the ultrasound data into a transform domain;

(b) exporting the transformed ultrasound data to a remote processor;

(c) image processing the exported, transformed ultrasound data in the transform domain; and (d) inverse transforming the image processed ultrasound data.

37. The method of claim 36 further comprising:

(e) displaying an image responsive to the inverse transformed ultrasound data.

38. The method of claim 36 further comprising:

(e) storing the ultrasound data in the transform domain.

39. The method of claim 36 further comprising:

(e) compressing the transformed ultrasound data prior to (b).

40. A medical diagnostic ultrasound system for processing ultrasound data, the system comprising:

a first processor for transforming the ultrasound data into a transform domain and for exporting the transformed ultrasound data to a remote processor;

a remote processor for image processing the exported, transformed ultrasound data in the transform domain, and inverse transforming the image processed ultrasound data; and a display for generating an image responsive to the inverse transformed ultrasound data.

41. The system of claim 40 wherein the first processor is operable to compress the transformed ultrasound data prior to export.

* * * * *

UNITED STATES PATENT AND TRADEMARK OFFICE

CERTIFICATE OF CORRECTION

PATENT NO. : 6,042,545
DATED : March 28, 2000
INVENTOR(S) : John A. Hossack et al.

It is certified that error appears in the above-identified patent and that said Letters Patent is hereby corrected as shown below:

Title Page:
Column 2, line 6, delete *"Devices;"* and substitute --*Devices:*-- in its place.

Specification:
Column 3, line 65, delete "(e.g." and substitute --(e.g. -- in its place.
Column 4, line 10, delete "image" and substitute --Image-- in its place.
Column 5, line 56, delete "26" and substitute --22,-- in its place.

Claims:
Claim 23, line 3, delete "data:" and substitute --data;-- in its place.

Signed and Sealed this

Twenty-fourth Day of July, 2001

*Attest:*

Nicholas P. Godici

NICHOLAS P. GODICI

*Attesting Officer* *Acting Director of the United States Patent and Trademark Office*